United States Patent [19]

Thigpen

[11] 3,921,755
[45] Nov. 25, 1975

[54] TOWABLE SEISMIC DETECTOR CONVEYANCE

[75] Inventor: Ben B. Thigpen, Houston, Tex.

[73] Assignee: Western Geophysical Company of America, Houston, Tex.

[22] Filed: Oct. 1, 1973

[21] Appl. No.: 402,640

Related U.S. Application Data

[63] Continuation-in-part of Ser. No. 139,426, May 3, 1971, Pat. No. 3,825,886, and a continuation-in-part of Ser. No. 171,818, Aug. 16, 1971, abandoned.

[52] U.S. Cl. .............. 181/122; 181/112; 340/7 R; 340/3 T
[51] Int. Cl.² ............................................. G01V 1/20
[58] Field of Search ............ 340/7 R, 17, 8 R, 3 T; 174/70 R, 70 S; 181/112, 122

[56] References Cited
UNITED STATES PATENTS

| | | | |
|---|---|---|---|
| 1,584,613 | 5/1926 | Comstock | 340/7 R |
| 2,544,819 | 3/1951 | Babb et al. | 340/7 R |
| 2,551,417 | 5/1951 | Carlisle | 340/3 T |
| 2,649,579 | 8/1953 | Alexander | 340/7 R |
| 2,654,077 | 9/1953 | McLoad | 339/147 |
| 2,807,793 | 9/1957 | Bayhi | 340/7 R |
| 3,299,397 | 1/1967 | Pavey, Jr. et al. | 340/7 R |
| 3,317,891 | 5/1967 | Bradley | 340/17 |
| 3,689,875 | 9/1972 | Kostelnicek | 340/7 R |

*Primary Examiner*—Maynard R. Wilbur
*Assistant Examiner*—H. A. Birmiel
*Attorney, Agent, or Firm*—Michael P. Breston

[57] ABSTRACT

Seismic exploration is conducted by towing a detector conveyance over and in contact with the earth's surface. The conveyance includes a flexible wide belt carrying a plurality of spaced-apart seismic detectors. Signal carrying channels interconnect the detectors with a signal-utilization device. The width dimension of the belt is considerably greater than its thickness dimension to prevent any portion of the belt from rotating or overturning when the belt is being dragged over extended surfaces of the earth.

4 Claims, 14 Drawing Figures

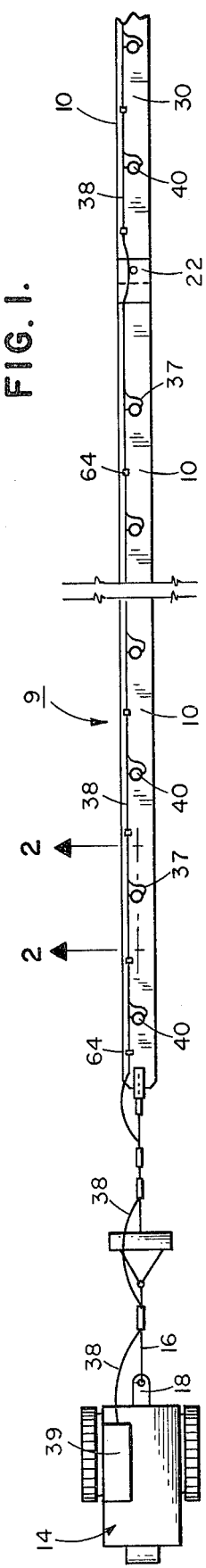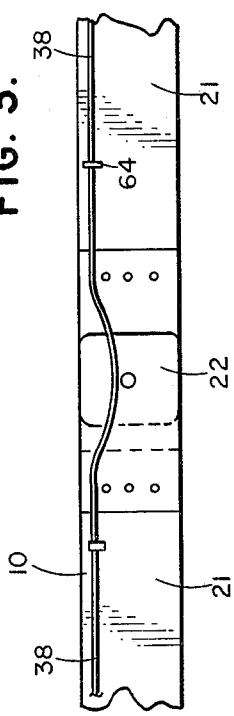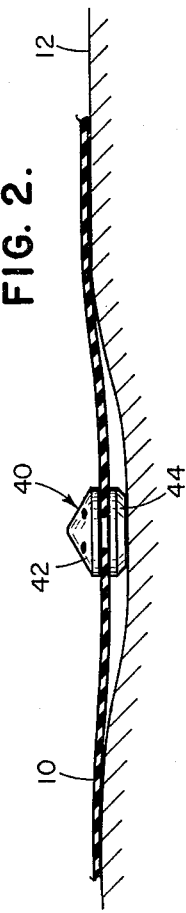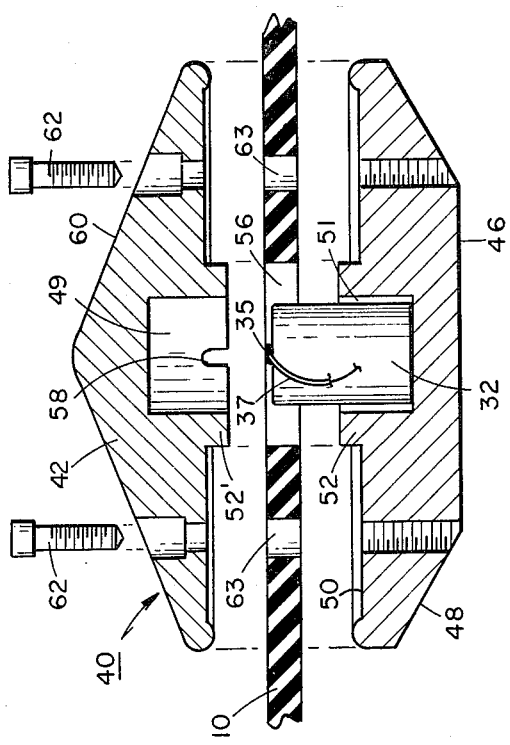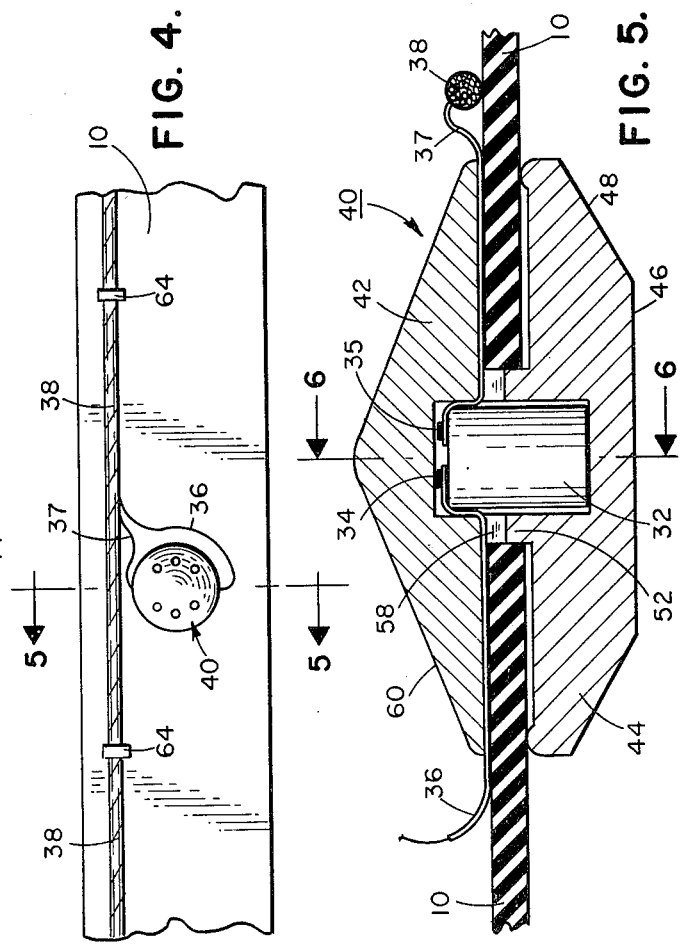

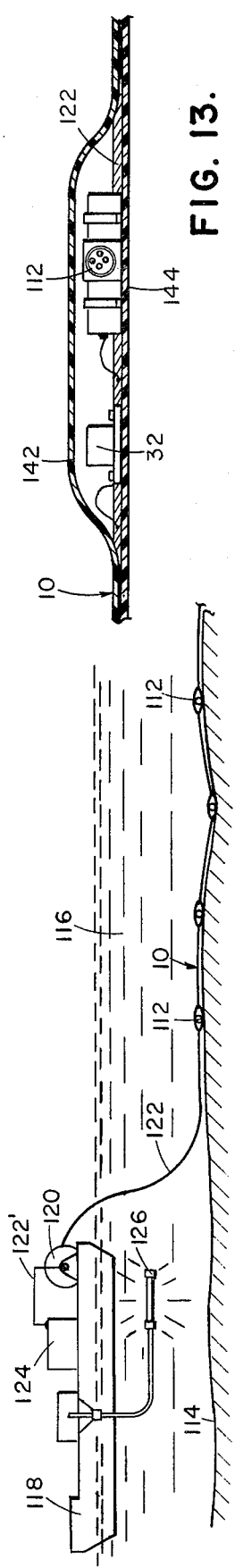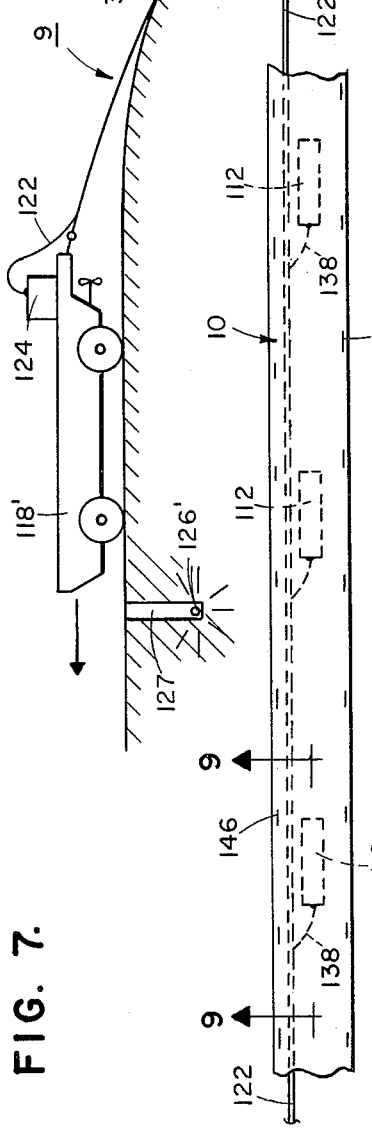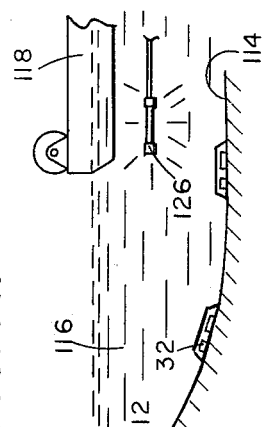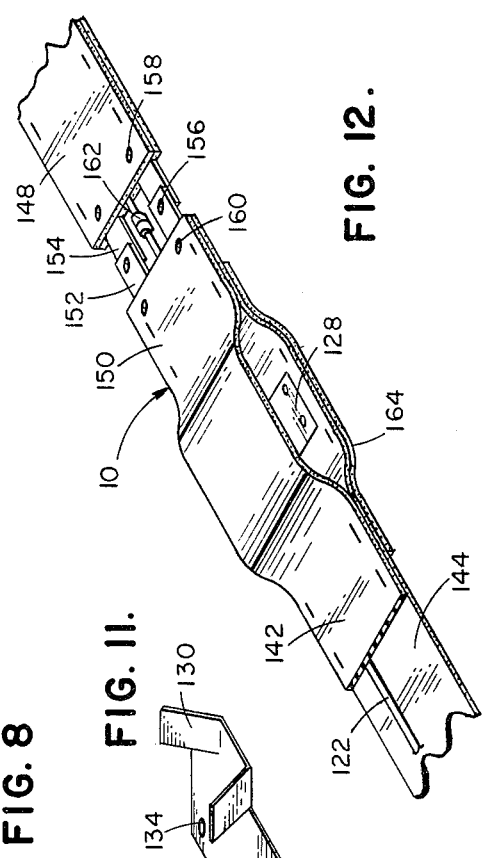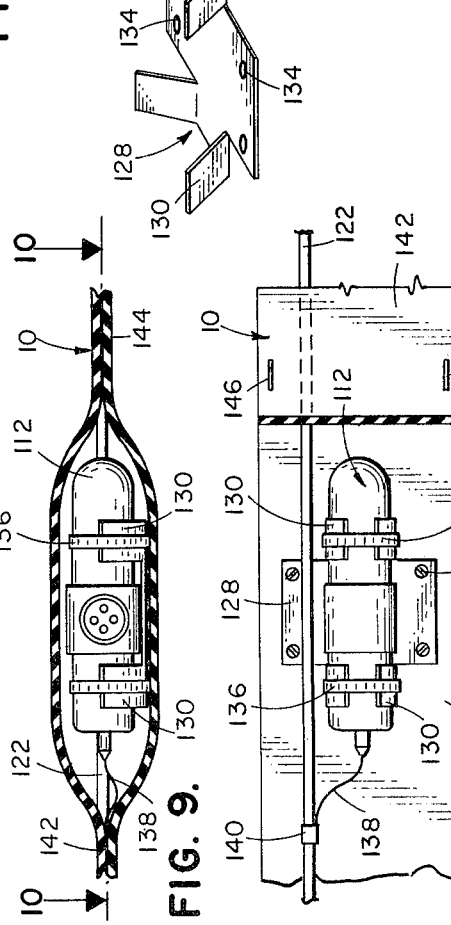

TOWABLE SEISMIC DETECTOR CONVEYANCE

CROSS-REFERENCE TO RELATED APPLICATIONS

This application is a continuation-in-part of my co-pending applications Ser. Nos. 139,426, filed May 3, 1971, now U.S. Pat. No. 3,825,886, and 171,818 filed Aug. 16, 1971, now abandoned.

BACKGROUND OF THE INVENTION

Marine seismic surveys, using conventional hydrophone streamers, can be conducted shorewards to depths as shallow as 30 to 40 feet. On the other hand, land surveys can be conducted oceanwards only as far as the surfline. A gap in the seismic survey may therefore exist between the land and the marine surveys. To close the gap, various forms of detector conveyances have been proposed to be dragged either along the bottom of a body of water or on land, or to be laid on the ground, lifted therefrom and moved to another location.

U.S. Pat. No. 2,738,488 shows a seismic marine cable adapted for dragging over and cutting into a water-submerged surface. The cable is an armored-conductor cable to which are connected a plurality of detector housings of substantially cylindrical configuration.

U.S. Pat. No. 2,551,417 also shows a cable on which a plurality of seismic detector housings are mounted. Each housing consists of two sections which form an elongated drag for movement in the direction of its longitudinal axis. A geophone is mounted in each housing on gimbals to maintain it in a vertical direction.

U.S. Pat. No. 1,584,613 shows a plurality of microphones connected either in parallel or in series to a pair of conductors covered with insulation thereby to form a long detector conveyance. The detector conveyance is flat and can be towed by a ship in the body of water but not in contact with the earth in a manner similar to a conventional seismic streamer cable. Thus, although this conveyance is flat and towable, it is not adapted to be towed over and in contact with the earth's surface.

U.S. Pat. No. 2,649,579 relates to a long seismometer of the capacitor type wherein seismic vibrations cause small changes in the spacing of elongated flexible conductors acting as the plates of the capacitor. The long seismometer is made from two, flat, elongated conductors arranged in parallel planes on a flexible support so that when the seismometer is laid out upon the ground the two conductors will be placed in motion relative to each other when a seismic disturbance reaches the seismometer. A series of weights suitably spaced from each other are laid on the seismometer to effect coupling with uneven ground. The relative motion of the conductors causes the inherent capacity of the seismometer to change. A nearby electronic network is connected to the conductors to measure capacitative changes. After a measurement is made at one location, the flexible long seismometer is lifted or reeled up and carried to another location to repeat the seismic shooting and detecting cycles.

U.S. Pat. No. 2,807,793 also shows a continuous, flexible geophone arrangement which comprises a laterally flattened support member, a plurality of individual permanent magnets, and a continuous spiral conductor passing around the magnets. The geophone arrangement resembles a deflated fire hose. In rough or irregular terrean, the patentee suggests employing a roller to force the geophone into more intimate contact with the ground.

The elongated devices described in U.S. Pat. Nos. 2,649,579 and 2,807,793 were not intended to be dragged over the earth's surface. They were designed to be lifted and moved from one seismic detection station to another.

U.S. Pat. No. 3,275,097 includes hydrophones mounted on sleds which are interconnected by suitable tow-cables. The entire array can be dragged over the area to be surveyed. The little sleds or carts can become seriously damaged or entangled when the cable is dragged over a rough bottom or a bottom containing ship-wrecks, debris, rocks, coral heads, and the like.

Thus many attempts have been made to provide an elongated geophone to substitute for a plurality of small geophones. Nevertheless, seismometers of the capacitor type, as shown in U.S. Pat. No. 2,649,579, and of the magnetic type, as shown in U.S. Pat. No. 2,807,793, have not yet been adopted for general use by the seismic industry. In fact, as far as I know, they were never used commercially.

The problems encountered in towing geophones are described in U.S. Pat. No. 2,551,417. The patentee provides gimbals to maintain the needed vertical orientation for the geophones.

While relatively flat elongated detector supports were suggested in the prior art, there is no teaching for dragging over the earth's surface a detector conveyance having a belt which is sufficiently heavy to provide intimate earth contact with the detectors without the need for auxilliary weights (as in U.S. Pat. No. 2,649,579) or for a roller (as in U.S. Pat. No. 2,807,793) to maintain the detectors properly coupled to the ground. In sum, prior art flat detector conveyances did not have a belt which was draggable over and in contact with the earth's surface, while prior art draggable detector conveyances were not flat and of uniform width. They rotated, twisted and tangled because they were not flat.

It is an object of the present invention to provide a long flexible belt adapted to transport seismic detectors. The belt has a uniform width throughout its length. Its width is considerably greater than its thickness, to prevent portions of the belt from overturning when the belt is dragged over and in contact with the earth's surface. This invention eliminates the need for gimbals, as shown in U.S. Pat. No. 2,551,417 or sleds as in U.S. Pat. No. 3,275,097.

It is a further object of this invention to provide a belt which is stretchable to some extent, which readily conforms to the contours of the earth's surface, which has sufficient mass to hug the ground without the need for additional weights, which is sufficiently strong to be towed without twisting, and which easily slides over obstructions without becoming entangled.

SUMMARY OF THE INVENTION

This invention contemplates conducting seismic exploration by towing an elongated belt over and in continuous contact with the earth's surface. The belt has throughout its length a substantially uniform width which is considerably greater than its thickness to prevent any portion of the belt from overturning when the belt is being dragged over the earth's surface. A plurality of seismic detectors are mounted on the belt for detecting reflected seismic waves therewith.

BRIEF DESCRIPTION OF THE DRAWINGS

FIG. 1 is a schematic representation of a land seismic geophone conveyance towed by a prime mover;

FIG. 2 is a sectional view on line 2—2 in FIG. 1 which illustrates the coupling between a detector and the underlying ground;

FIG. 3 illustrates the manner of coupling two adjacent detector conveyances;

FIG. 4 is an enlarged top view of a portion of the detector conveyance shown in FIG. 1;

FIGS. 5 and 6 are sectional views on lines 5—5 and 6—6 in FIGS. 4 and 5, respectively;

FIG. 7 is a schematic representation of a marine seismic hydrophone conveyance towed by a shallow-water vessel;

FIG. 8 is a fractional top view illustrating the manner of mounting and electrically interconnecting the hydrophones;

FIG. 9 is a sectional view on line 9-9 illustrating in detail the manner of sandwitching a hydrophone between two plys of the belt;

FIG. 10 is a sectional view on line 10-10 showing the manner of electrically connecting a hydrophone;

FIG. 11 is a view in perspective of a hydrophone mounting plate;

FIG. 12 shows the manner of interconnecting two hydrophone belt sections, and in addition illustrates the manner of reinforcing the belt in the region of the hydrophone;

FIG. 13 shows the manner of mounting a geophone next to a hydrophone between two plys of the belt; and FIG. 14 is a schematic representation of a land-sea seismic detector conveyance.

In the drawings the same reference characters are used to designate the same or similar parts. In FIGS. 1–6, a detector conveyance generally designated as 9, is shown being towed over the earth's surface by a suitable vehicle 14 through a tow line 16 attached to a hitch 18. Conveyance 9 includes a belt 10 which is very long, say on the order of several thousand feet, and is formed from individual belt sections 21 (FIG. 3). Throughout its length belt 10 has a substantially uniform width dimension which is considerably greater than its thickness dimension thereby preventing any portion of the belt from overturning when the belt is being dragged over extended surfaces of the earth. Belt 10 can be made of fabric, rubber, plastic, leather or combinations thereof. A practical material for constructing belt 30 is conveyer belting which is typically composed of plys of plastic fibers impregnated with a slow-aging polyurethane or rubber compound. Adjacent belt sections 21 can be joined together either by cementing or by suitable coupling means 22. Conveyer belting is flexible, flat and yet sufficiently strong to withstand the abrasiveness of the earth's top layer which may include rocks, debris, coral heads, and the like.

For land seismic prospecting, there are mounted on belt 10 a plurality of longitudinally spaced-apart detectors such as geophones 32 (FIG. 5). Each geophone includes a coil assembly (not shown) which is moveable relative to a magnetic structure supported by a geophone casing. The movement of the coil assembly generates electric signals across the geophone's output terminals 34, 35, which are electrically coupled by wires 36, 37, respectively, to a signal channel in a multi-conductor cable 38. Cable 38 feeds the output signals from all of the geophones 32 to a signal utilization device 39 (FIG. 1) which typically includes a recorder.

The geophones 32 are typically grouped on the belt in geophone arrays in a conventional manner. An array can extend over a portion or an entire belt section 21. On the other hand, an array can extend over two or more such sections, as will be apparent to those skilled in the art. Thus, for simplicity of the drawings, each geophone 32 actually represents a cluster of geophones forming a geophone array.

The formation of each array and the type of detectors to be employed will depend on the preferred seismic exploration technique, and on the nature of the earth's surface. Accordingly, the term "seismic prospecting" or its equivalent whenever used in this specification covers all known seismic prospecting techniques, for example, single-fold reflection, common-depth-point reflection, refraction profiling, etc. Also, the term "seismic detector" as used herein, is not limited to any particular detector and may include detectors of the dynamic, variable-reluctance, solid-state, pressure-responsive, etc., type. All such detectors are adapted to convert seismic energy into electrical energy when the detectors are seismically coupled to the ground 12. This electric energy is typically amplified, recorded, combined and corrected as may be necessary or desirable by the utilization device 39.

An important advantage of this invention is derived from the fact that the flat, wide, flexible belt 10 allows the use of relatively inexpensive "vertical" geophones without the need to have them mounted on gimbals. These geophones are adapted to vibrate along an axis perpendicular to the earth's surface, that is, an axis perpendicular to the direction of tow.

To provide good seismic coupling between each geophone 32 and ground 12, each geophone is snugly fitted inside a housing, generally designated as 40, having an upper half section 42 and a lower half section 44.

The lower half section 44 has an outer surface defining a flat central circular area 46, and an upwardly extending curved surface 48. The flat surface 46 is designed to provide optimum seismic coupling between housing 40 and ground 12. The curved surface 48 is designed to allow housing 40 to ride smoothly even over an irregular land surface without snagging.

Extending from the upper surface 50 into the lower-half section 44 is a cylindrical cavity 51 having an outwardly projecting annular shoulder 52. Cavity 51 has a mating opposite cavity 49 in the upper-half housing 42 and shoulder 52 has a mating shoulder 52'. The height of each of shoulders 52 and 52' is substantially equal to one-half the thickness of belt 10 to allow the belt to become sandwiched between the two half housings 42 and 44. The inner diameters of cavities 49 and 51 are slightly larger than the outer diameter of the geophone's casing to allow a close fit between the geophone and housing 40. The outer diameter of shoulders 52, 52' is slightly smaller than the inner diameter of a perforation 56 (FIG. 6) in belt 10.

The upper-half housing 42 has an aerodynamically shaped surface 60 to minimize wind resistance and hence wind-generated noise in the geophone. A plurality of bolts 62, symmetrically positioned around a circumference, extend vertically downwardly through a plurality of correspondingly positioned bores 63 in the belt 10. Thus the bolts 62 detachably clamp the two half-housings 42, 44 together and to the belt 10.

A diametrically-extending groove 58 in shoulder 52' allows terminal wires 36, 37 to extend therethrough. The multiconductor cable 38 is stapled to the upper surface of belt 30 by suitable staples 64. Cable 38 can of course be molded within the belting material, if desired. Cable 38 is typically formed of sections which are suitably interconnected by multi-conductor plugs (not shown), well known in the art.

Under certain operating and environmental conditions, the vibrations of belt 10 can be undesirably transferred to the detector's housing 40. Accordingly, each housing 40 should be acoustically isolated from the belt as described in my U.S. Pat. No. 3,825,886.

Referring now to FIGS. 7–12, for marine seismic prospecting, belt 10 carries a plurality of hydrophones 112. Belt 10 rests upon the bottom 114 beneath a body of water 116 and is towed by a shallow-water vessel 118. Vessel 118 houses a reel 120 for storing, when not in use, belt 10. A very long multi-conductor cable 122 followed by a short cable 122' interconnects the hydrophones 112 with a signal utilization device 124 on vessel 118. A source of acoustic energy 126 is also towed in the water beneath vessel 118. Reflected seismic waves are detected by hydrophones 112 and are converted to electric signals which are transmitted to device 124 by cable 122 for recording.

Each hydrophone is mounted by means of a mounting plate 128 having tabs 130. Plate 128 is secured to belt 10 by bolts 132 passing through holes 134. Tabs 130 are bent around the body of hydrophone 112 which is firmly secured in place by straps 136. A pigtail 138 interconnects each hydrophone 112 with cable 122 at a take out 140. A plurality of such take outs 140 are mounted at intervals along cable 122.

As illustrated in FIG. 9, belt 10 is composed of at least two-plys, an upper ply 142 and a lower ply 144 between which is sandwiched a hydrophone 112 and its mountings, as well as cable 122. The sensitive hydrophones are thus protected from damage while being towed over seabottom 114. Plys 142 and 144 are suitably stapled together by staples 146.

Inasmuch as the entire belt may be up to one and a half miles long, it is convenient to divide it into sections. Mechanical and electrical connections are provided at the ends of each section, as shown in FIG. 12. For example, sections 148 and 150 are provided with connecting lugs 152 and 154, respectively. Each lug is bolted to its opposite mate by a bolt 156. Lugs 152 and 154 are bolted to their respective belt sections by bolts 158 and 160. Cable 122 can be joined between sections 148 and 150 by means of a water proof connector 162 of a type well known to the art.

In many areas the sea floor is irregular and abrasive. It therefore becomes desirable to reinforce the bottom part of belt 10, particularly in the regions where hydrophones are mounted. Accordingly, an additional ply 164 may be added beneath the portion of belt 11 where hydrophones are mounted. Belt 10 has sufficient density to allow it to always rest upon the bottom 114. Since the belt has a broad low profile, bottom-sea currents and wave action in the surf will not easily shift it from its rest position.

With conveyance 9 it is now possible to extend a marine seismic survey to shallow water depths and to continue the survey through the surfline into and over the adjoining land.

Referring to FIGS. 13 and 14, a seismic detector conveyance 9, which is especially suitable for land and sea surveys, includes geophones 32 and hydrophones 112 mounted next to each other and sandwiched between plys 142 and 144. Each geophone and hydrophone is connected to a pair of conductors in the multi-conductor cable 122. Reflected seismic waves cause wave-pressure variations which are sensed by the hydrophones 112. Reflected seismic waves are also sensed by the geophones 32 which detect small motions of the bottom 114. The detected signals are transmitted to the signal utilization device 124 by the cable 122.

In the land-sea transition zone, vessel 118 may be anchored just outside the surfline, and source 126 provides the necessary seismic energy. Alternatively, a shot hole 127 could be drilled into the earth ashore, and a suitable source 126' of acoustic waves, such as dynamite may be used.

On the seaward portion of belt 10, both hydrophones 112 and geophones 32 detect seismic energy; on the landward portion of belt 10, only geophones 32 will detect such energy; the hydrophones 112, not being surrounded by an incompressible liquid, become insensitive. A suitable land-sea vehicle 118' will drag the conveyance 9 over the land. Because data from both hydrophones and geophones have been simultaneously but separately recorded in the utilization device 124, precise matching can be made between the seismic signals detected by the hydrophones and those detected by the geophones.

What is claimed is:

1. A towable seismic detector conveyance comprising:
   a substantially flat, long, flexible support member,
   said member having a substantially uniform width throughout its length, and the width dimension of said member being considerably greater than the thickness dimension of said member to prevent any portion of said member from overturning when said member is being dragged over extended surfaces of the earth;
   a multi-conductor cable longitudinally mounted on said support member;
   a plurality of longitudinally spaced apart seismic detectors carried by said member, said detectors being grouped into seismic detector arrays;
   means for electrically connecting each detector array to a pair of conductors in said cable; and
   said cable being adapted for connection to a multi-channel seismic signal utilization apparatus.

2. In combination:
   a self-propelled carrier,
   a multi-channel seismic signal utilization apparatus mounted on said carrier;
   a towable seismic detector conveyance comprising: a substantially flat, long, flexible support member, said member having a substantially uniform width throughout its length, and the width dimension of said member being considerably greater than the thickness dimension of said member to prevent any portion of said member from overturning when said member is being dragged over extended surfaces of the earth; a multi-conductor cable longitudinally mounted on said support member; a plurality of longitudinally spaced apart seismic detectors carried by said member, said detectors being grouped into seismic detector arrays; means for electrically connecting each detector array to a pair of conductors in said cable; said cable being adapted for connection to said multi-channel seismic signal utilization apparatus; and coupling means connecting said conveyance to said carrier for towing said conveyance over and in contact with the earth's surface.

3. The conveyance of claim 1 wherein, said member is a belt, and each detector has a housing adapted to couple the detector with the earth's surface during tow.

4. A method of seismic exploration over the earth's surface including the steps of:

a. towing an elongated belt to a first preselected position on the earth's surface at the bottom of a body of water, said belt supporting an array of hydrophones and an array of geophones, said arrays being co-extensively arranged on said belt;

b. causing seismic waves to propagate through said body of water and through the earth thereby producing reflected seismic waves from sub-surface formations;

c. measuring earth motions due to said reflected seismic waves with said geophones, and measuring water-pressure variations due to said reflected seismic waves with said hydrophones;

d. simultaneously recording on separate channels of a signal-utilization device the outputs from said arrays of geophones and hydrophones;

e. towing said belt to other preselected positions on the earth's surface; and repeating steps (b), (c) and (d) wherein a portion of said belt at certain ones of said other preselected positions lies underwater and another portion of said belt lies on a dry land surface.

* * * * *